(12) United States Patent
Hunter et al.

(10) Patent No.: US 9,555,880 B2
(45) Date of Patent: Jan. 31, 2017

(54) FLEXBEAM ROTOR

(75) Inventors: David H. Hunter, Cheshire, CT (US); Ryan Thomas Casey, West Haven, CT (US); Francis Edward Byrnes, White Plains, NY (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 732 days.

(21) Appl. No.: 13/368,795

(22) Filed: Feb. 8, 2012

(65) Prior Publication Data

US 2012/0201678 A1 Aug. 9, 2012

Related U.S. Application Data

(60) Provisional application No. 61/441,068, filed on Feb. 9, 2011.

(51) Int. Cl.
*B64C 27/33* (2006.01)
*B64C 27/35* (2006.01)

(52) U.S. Cl.
CPC ..................... *B64C 27/33* (2013.01)

(58) Field of Classification Search
CPC ................... B64C 27/33; B64C 27/35
USPC ............. 416/134 A, 140, 135, 145, 146 R, 146 A, 416/147–156, 157 R, 157 A, 157 B
See application file for complete search history.

(56) References Cited

U.S. PATENT DOCUMENTS

| | | | |
|---|---|---|---|
| 3,669,566 A * | 6/1972 | Bourquardez et al. | B29D 99/0025 416/134 A |
| 3,874,815 A * | 4/1975 | Baskin | 416/134 R |
| 4,093,400 A * | 6/1978 | Rybicki | 416/134 A |
| 4,299,538 A * | 11/1981 | Ferris | B64C 27/33 416/134 A |
| 4,427,340 A * | 1/1984 | Metzger | B64C 27/51 416/134 A |
| 4,601,639 A * | 7/1986 | Yen | B64C 27/473 416/144 |
| 4,650,401 A * | 3/1987 | Yao | B64C 27/33 416/134 A |
| 4,676,720 A * | 6/1987 | Niwa | B64C 27/51 416/134 A |
| 4,746,272 A * | 5/1988 | Noehren et al. | 416/134 A |
| 5,091,029 A * | 2/1992 | Davis | B29C 53/564 156/169 |
| 5,092,738 A * | 3/1992 | Byrnes et al. | 416/134 A |
| 5,110,259 A * | 5/1992 | Robinson | F16F 1/393 144/144.1 |
| 5,188,513 A * | 2/1993 | Byrnes | 416/134 A |
| 5,460,487 A * | 10/1995 | Schmaling et al. | 416/134 A |
| 5,499,903 A * | 3/1996 | Schmaling et al. | 416/134 A |
| 6,848,886 B2 * | 2/2005 | Schmaling et al. | 416/134 A |

(Continued)

*Primary Examiner* — Sean J Younger
(74) *Attorney, Agent, or Firm* — Cantor Colburn LLP

(57) ABSTRACT

A rotor hub assembly for a helicopter includes a rotor hub operably connectable to a shaft of a helicopter. One or more flex beams extend through the rotor hub, with each end of each flex beam operably connectable to a rotor blade. One or more inner bearings are located at the rotor hub to spherically support the one or more flex beams in the rotor hub. A rotor assembly for a helicopter includes a rotor hub operably connectable to a shaft of a helicopter. One or more flex beams extending through the rotor hub and one or more inner bearings are located at the rotor hub to spherically support the one or more flex beams in the rotor hub. A plurality of rotor blades are operably connected to the ends of the one or more flex beams.

22 Claims, 5 Drawing Sheets

(56) References Cited

U.S. PATENT DOCUMENTS

2003/0235499 A1* 12/2003 Schmaling ................ 416/134 A
2012/0201678 A1* 8/2012 Hunter et al. ............ 416/134 A

* cited by examiner

FLEXBEAM ROTOR

CROSS REFERENCE TO RELATED APPLICATION

This application claims priority to U.S. provisional application 61/441,068, filed Feb. 9, 2012, the entire contents of which are incorporated herein by reference.

BACKGROUND OF THE INVENTION

The subject matter disclosed herein generally relates to rotors for aircraft use. More specifically, the subject disclosure relates to rotor head configurations for rotors of helicopters.

A typical rotor for, for example, a helicopter, includes a plurality of blades secured to a rotor hub. One configuration of helicopter rotor is a flex beam rotor head. The flex beam rotor head includes one or more flexible beams to which the plurality of blades are secured. The flex beams are typically constructed to at least partially accommodate blade flap and blade pitch changes of the rotor blades. For rotors having an even number of blades, one configuration of rotor head is referred to as a crossbeam rotor head. The crossbeam rotor head includes flex beams extending through an axis of rotation of the rotor and crossing at the axis of rotation. In a cross beam rotor head, a rotor blade is secured to each end of each flex beam. In a typical cross beam rotor, the flex beams are clamped to each other at the rotor hub and secured thereto. The clamping of the flex beams restrains the pitch motion of the flex beams at the rotor hub, thus the flex beams must be configured to accommodate the entire range of pitch change of the rotor blades over approximately one half of the flex beam's length, from the rotor hub to an attachment point of the rotor blade. Thus, to achieve acceptable service life, the geometry and composite laminate properties of the typical flex beam are modified to handle the blade pitch change, but this results in degraded aerodynamic efficiency of the rotor system given the geometrical constraints of the cross beam rotor head.

The art would well receive a flex beam rotor head which improves the aerodynamic efficiency of the rotor by improving the packaging constraints created by twisting of the flexbeam.

BRIEF DESCRIPTION OF THE INVENTION

According to one aspect of the invention, a rotor hub assembly for a helicopter includes a rotor hub operably connectable to a shaft of a helicopter. One or more flex beams extend through the rotor hub, with each end of each flex beam operably connectable to a rotor blade. One or more inner bearings are located at the rotor hub to spherically support the one or more flex beams in the rotor hub.

According to another aspect of the invention, a rotor assembly for a helicopter includes a rotor hub operably connectable to a shaft of a helicopter. One or more flex beams extending through the rotor hub and one or more inner bearings are located at the rotor hub to spherically support the one or more flex beams in the rotor hub. A plurality of rotor blades are operably connected to an end of the one or more flex beams.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
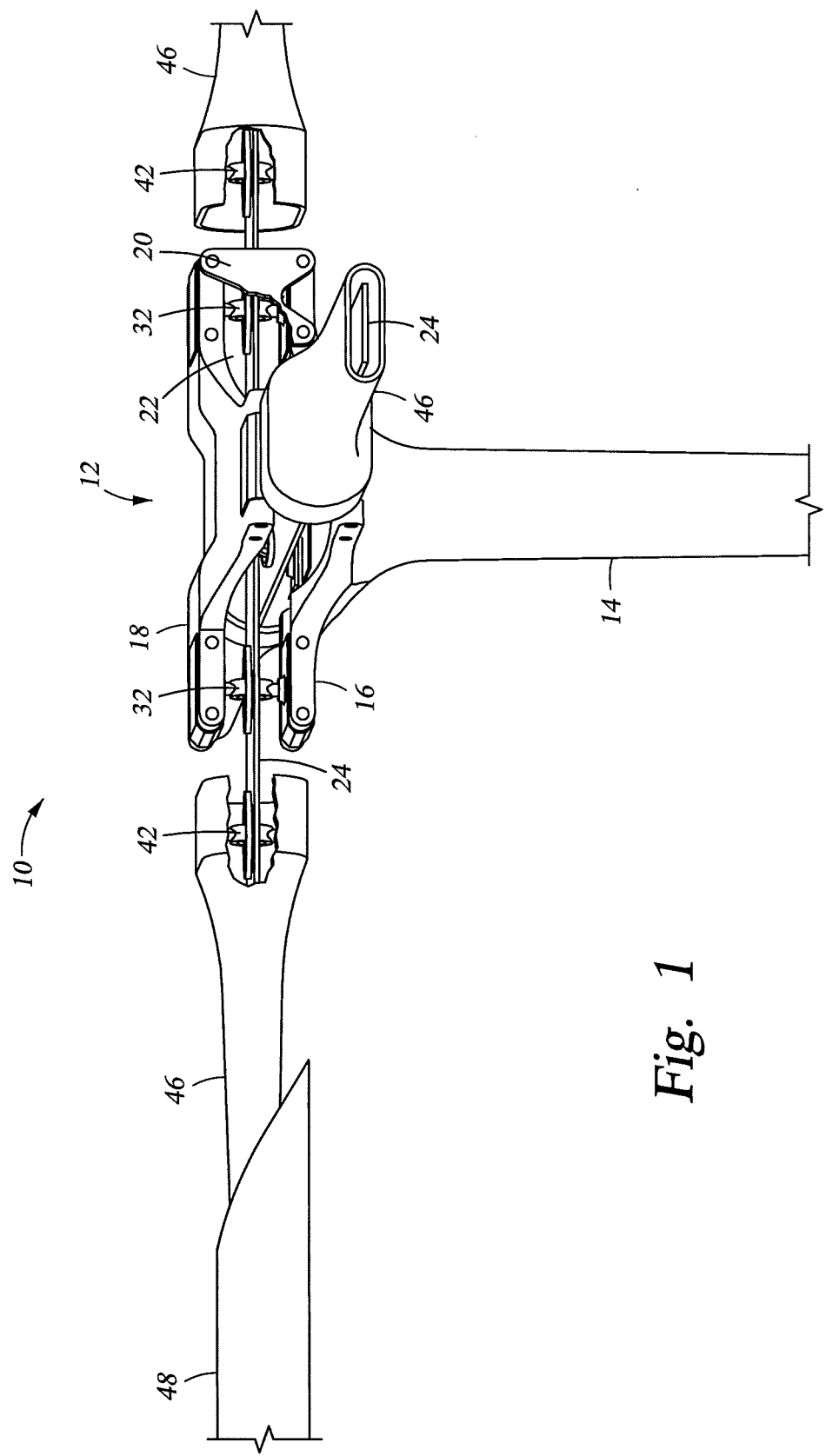
FIG. 1 is a perspective view of an embodiment of a rotor assembly for a helicopter.

Shown in FIG. 1 is an embodiment of an improved flex beam rotor assembly 10. The rotor assembly 10 includes a hub 12 located at a transmission shaft 14. The hub includes a lower hub 16 fixed to the transmission shaft 14. In some embodiments, the lower hub 16 is integral to the transmission shaft 14, but in other embodiments, the lower hub 16 is secured to the transmission shaft 14 by any conventional means, such as, for example, threaded fasteners or pins. An upper hub 18 is secured to the lower hub 16 utilizing, for example, brackets 20 extending between the upper hub 18 and lower hub 16 and fixed thereto.

Figure 2:
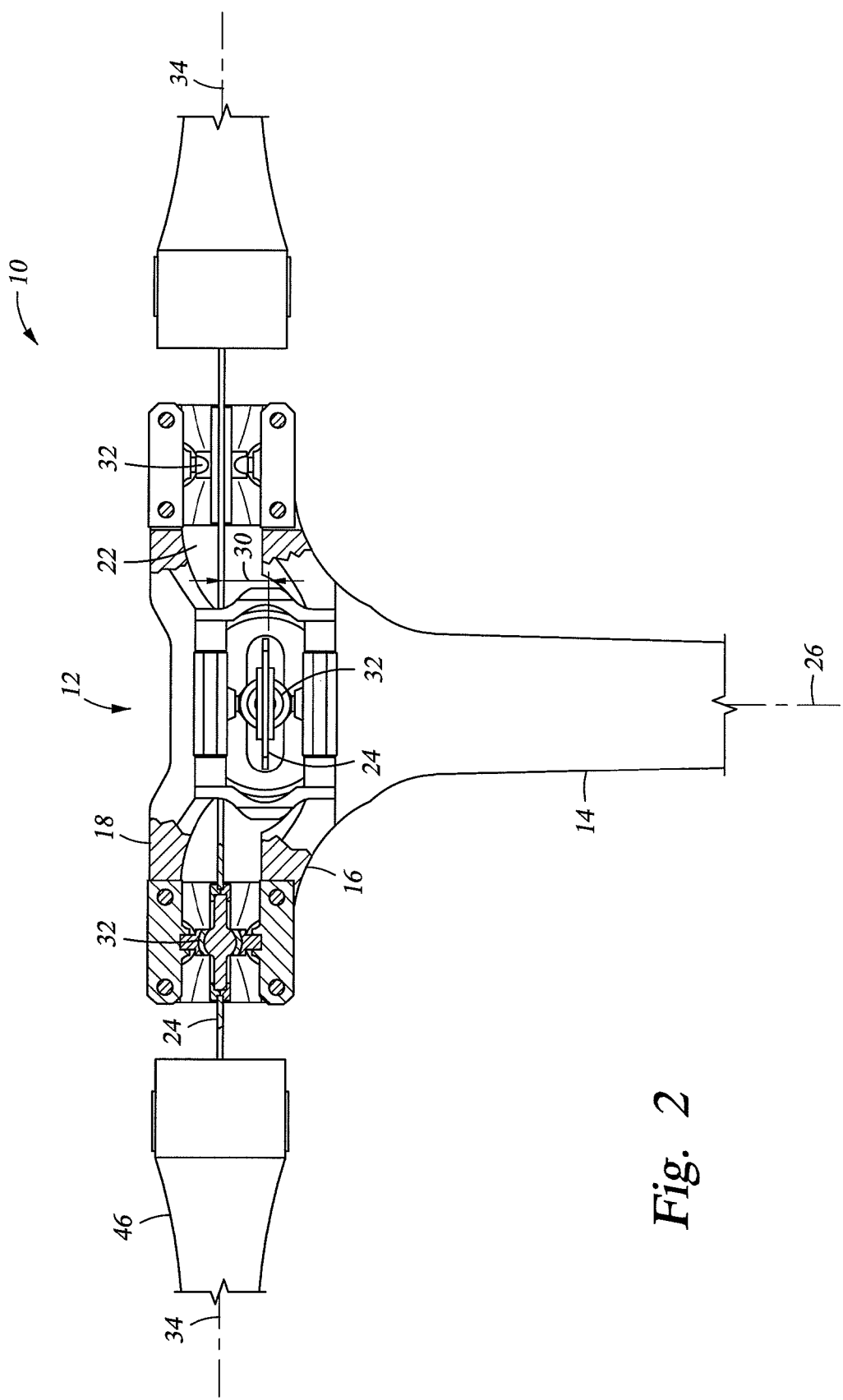
FIG. 2 is a cross-sectional view of an embodiment of a rotor assembly for a helicopter.

Referring now to FIG. 2, when assembled to each other, the upper hub 18 and the lower hub 16 define a hub cavity 22 therebetween. Two flex beams 24 extend through the hub cavity 22 across a transmission shaft axis 26. The embodiment of FIG. 2 is a four-blade rotor assembly 10 and two flex beams 24 are utilized. It is to be appreciated that for other even-numbered rotor configurations, ones with, for example, six rotor blades, additional flex beams 24 extend through the hub cavity 22. The flex beams 24 shown in FIG. 2 are substantially rectangular in cross-section, but it is to be appreciated that other cross-sectional shapes of flex beams 24, for example circular or oval cross-sections (discussed in more detail below), are contemplated within the scope of the present disclosure.

Figure 3:
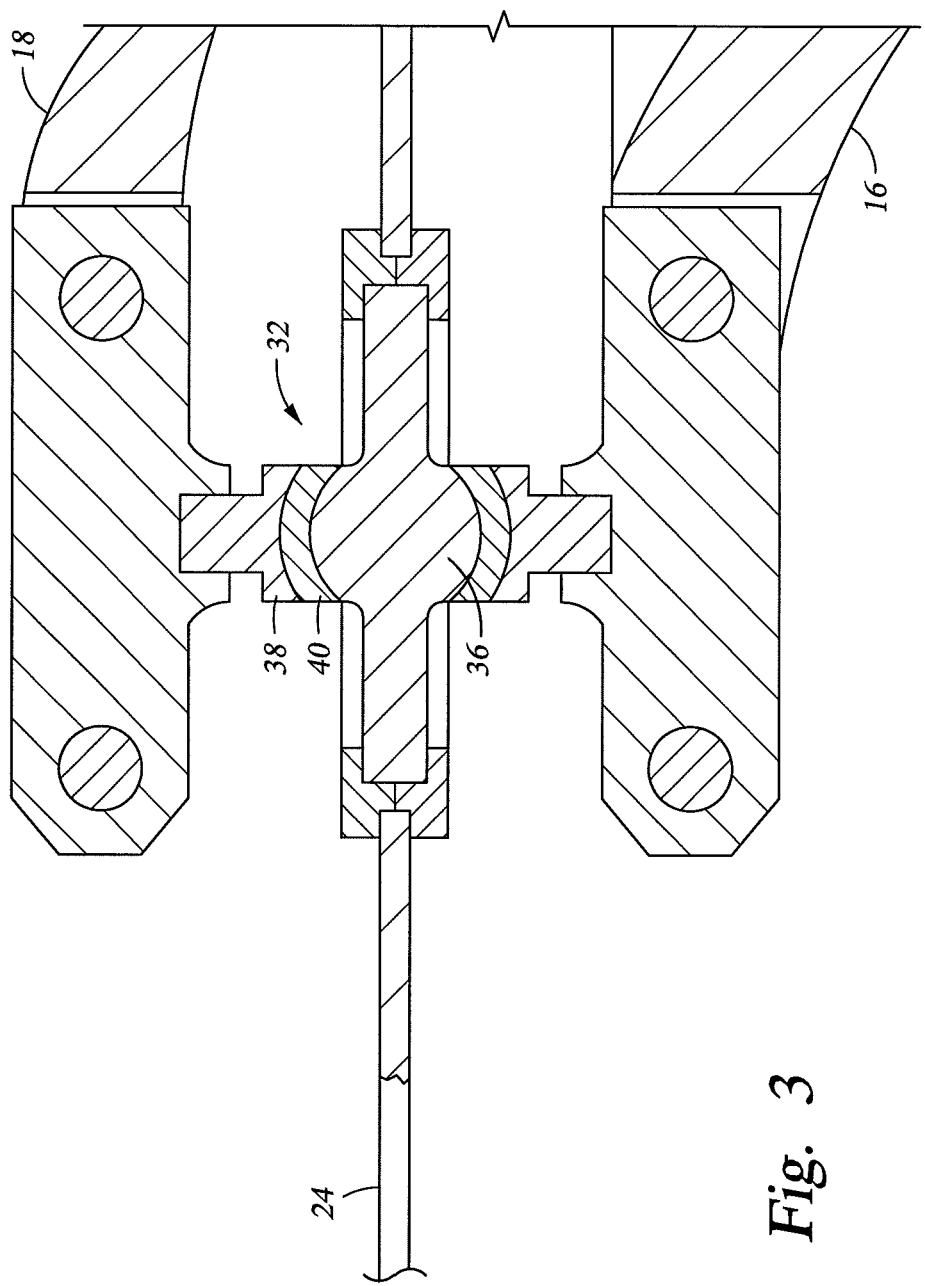
FIG. 3 is a cross-sectional view of an embodiment of a bearing for a rotor assembly.

The flex beams 24 are not fixed at the hub 12 like a traditional flex beam rotor assembly. The two flex beams 24 cross each other at the transmission shaft axis 26 and are separated by a flex beam gap 30. Each flex beam 24 is supported in the hub cavity 22 by one or more bearings, for example, spherical bearings or inner snubber bearings 32. The inner snubber bearings 32 spherically support the flex beams 24 allowing for at least rotation of each flex beam 24 about a beam pitch axis 34. As shown in FIG. 2, the inner snubber bearings 32 are secured to the upper hub 18 and/or lower hub 16. Referring now to FIG. 3, the inner snubber bearings 32 include an inner race 36 fixed to the flex beam 24 and an outer race 38 fixed to the upper hub 18 and the lower hub 16. A bearing portion 40 is disposed between the inner race 36 and the outer race 38 to facilitate relative motion between the flex beam 24 and the upper hub 18 and the lower hub 16. A clamping force of the upper hub 18 secured to the lower hub 16 provides a preload required for function of the inner snubber bearings 32. The inner snubber bearings 32 and the hub cavity 22 are sized to allow for rotation of the flex beams 24 a desired amount about the beam pitch axis 34.

Similarly, as shown in FIG. 1, an outer snubber bearing 42 is located at each flex beam 24 outboard of the inner snubber bearings 32. The outer snubber bearings 42 connect the flex beam end 24 to a torque tube 46. A rotor blade 48 is then secured to each torque tube 46. The outer snubber bearings 42 may have substantially the same construction as the inner snubber bearings 32, but in some embodiments, construction of the outer snubber bearings 42 may differ in some respects. For example, the outer snubber bearings 42 may be larger than the inner snubber bearings 32.

Figure 4:
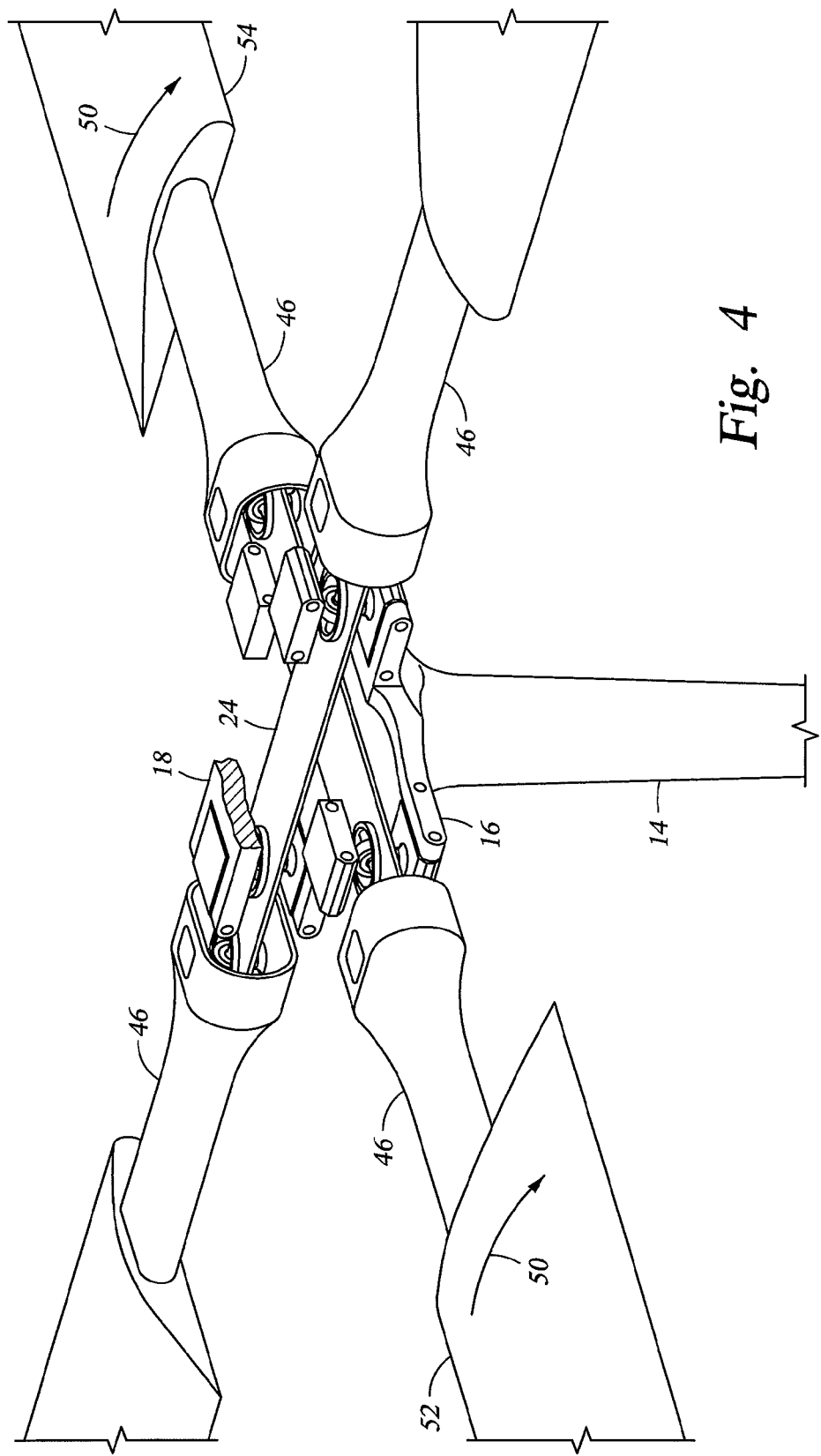
FIG. 4 is another perspective view of an embodiment of a rotor assembly.

When the rotor assembly 10 rotates about the transmission shaft axis 26, the rotor blades are subjected to collective pitch motion, in which all of the rotor blades 48 are pitched equally, and cyclic pitch motion, which results in differential pitch in the rotor blades 48. For example, as shown in FIG. 4, a cyclic pitch motion 50 on an advancing rotor blade 52 is in an opposite direction to the cyclic pitch motion 50 on a retreating rotor blade 54 relative to an aerodynamic angle of attack on the blade 48. In a conventional flex beam rotor where the flex beams are fixed at the hub, the cyclic pitch motion induces torsional twist into the flex beams. In the structure of the present disclosure, however, the flex beams 24 are free to rotate about the beam pitch axis 34 under the cyclic pitch motion. Because the desired cyclic pitch motion on opposing rotor blades 48 relative to the aerodynamic angle of attack are substantially opposite one another, the cyclic pitch motions for each rotor blade 48 are obtained in the flex beam 24 without inducing twist into the flex beam 24. This allows for a length of the flex beam 24 to be reduced, while remaining within the twist per unit length necessary to achieve a useful operating life of the flex beam 24, relative to a conventional flex beam rotor, resulting in a smaller, lighter, rotor 10 with an improved drag profile relative to the conventional flex beam rotor.

Figure 5:
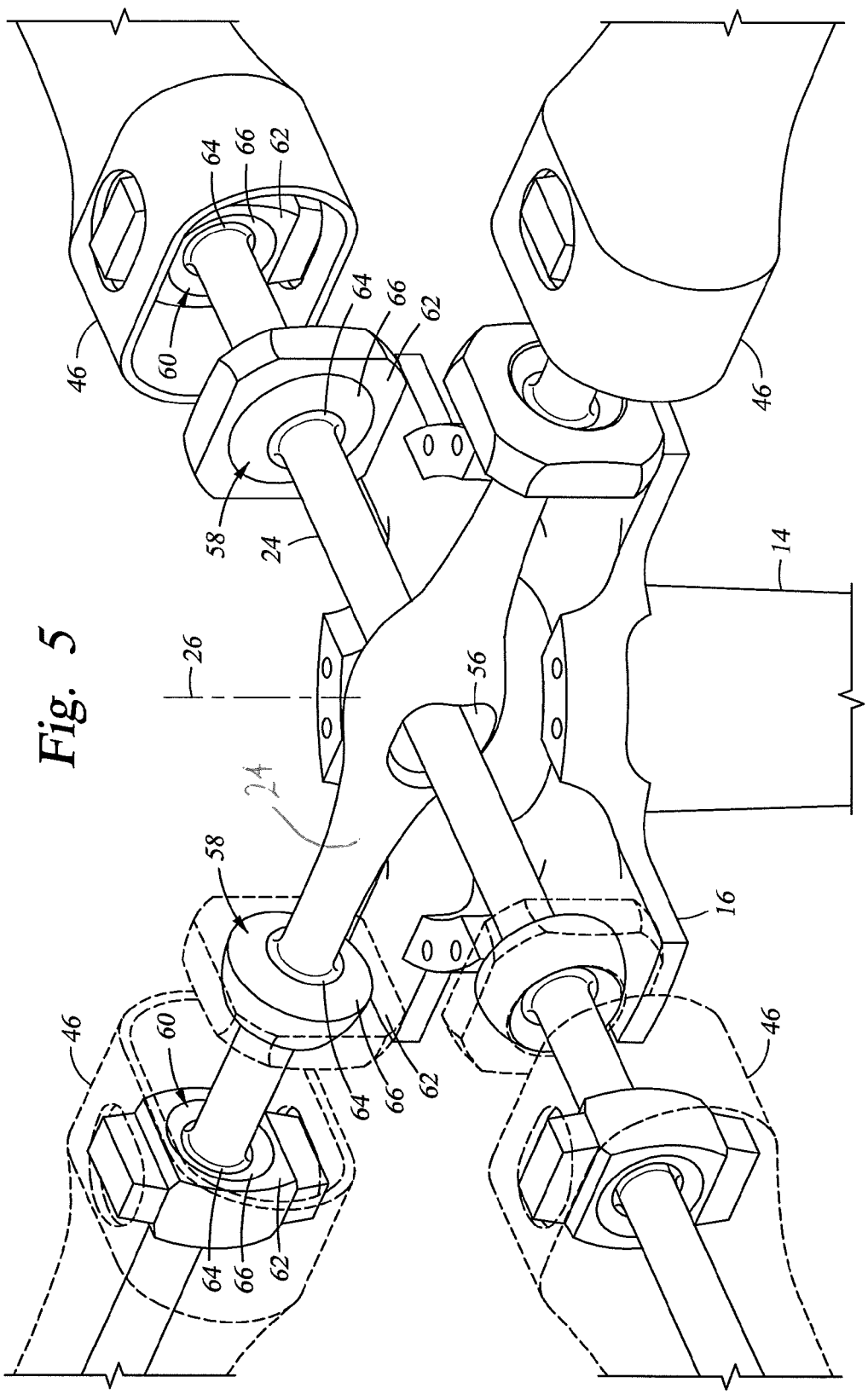
FIG. 5 is a perspective view of an embodiment of a rotor hub having circular cross-section flex beams.

As shown in FIG. 5, in other embodiments, the flex beams 24 may have a substantially circular cross-section, at least partially along a length of the flex beam 24. In a configuration, such as shown in FIG. 5, having two flex beams 24, the flex beams 24 cross at the transmission shaft axis 26. To reduce overall height of the hub 12, a first flex beam 24 includes a passage 56 therethrough which allows a second flex beam 24 to be installed through the first flex beam 24 at the axis 26. This makes the flex beam gap 30 effectively zero. Each flex beam is connected to the lower hub 16 and/or the upper hub 18 via two or more inner bearings 58, and are secured to a torque tube 46 at each end of the flex beam 24 via one or more outer bearings 60 located outboard of the inner bearings 58.

The inner bearing 58 includes an outer race 62 secured to the lower hub 16 and/or the upper hub 18. An inner race 64 is secured to the flex beam 24, and in some embodiments may be integral to the flex beam 24. A bearing portion 66 is located between the outer race 62 and the inner race 64 to facilitate relative motion, for example, rotational motion, between the flex beam 24 and the hub 12. A structure of the outer bearing 60 is similar to that of the inner bearing 58, with the outer race 62 secured to the torque tube 46 and the inner race 64 secured to, or integral to, the flex beam 24. The bearing portion 66 is located between the outer race 62 and the inner race 64 and facilitates relative motion between the flex beam 24 and the torque tube 46.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A rotor hub assembly for a helicopter comprising:
a rotor hub operably connectable to a shaft of a helicopter;
at least two flex beams extending through the rotor hub within the same plane, each end of each flex beam operably connectable to a rotor blade, the at least two flex beams comprising a first flex beam and a second flex beam, wherein an opening formed in the first flex beam defines a passage through which the second flex beam extends through the first flex beam such that the first flex beam and the second flex beam cross at an axis of the shaft; and
one or more inner bearings disposed at the rotor hub to spherically support the at least two flex beams in the rotor hub, the rotor hub being configured to provide a preload required for operation of the one or more inner bearings.

2. The rotor hub assembly of claim 1, wherein the one or more inner bearings are one or more inner snubber bearings, and wherein the first flex beam and the second flex beam are each formed of a substantially circular cross-section.

3. The rotor hub assembly of claim 1, wherein the one or more inner bearings include a first inner bearing and a second inner bearing configured to spherically support each flexbeam.

4. The rotor hub assembly of claim 1, wherein the rotor hub comprises an upper hub secured to a lower hub.

5. The rotor hub assembly of claim 4, wherein a compressive force between the upper hub and lower hub retains the one or more inner bearings in the rotor hub.

6. The rotor hub assembly of claim 4, wherein the upper hub and the lower hub define a hub cavity there between.

7. The rotor hub assembly of claim 6, wherein the at least two flex beams extend through the hub cavity.

8. The rotor hub assembly of claim 1, further comprising a plurality of torque tubes, wherein a first torque tube is secured to a first end of each flex beam and a second torque tube is secured to a second, opposite end of each flex beam.

9. The rotor hub assembly of claim 8, wherein the first torque tube and the second torque tube are secured to the first end and the second end of each flex beam, respectively via an outer bearing.

10. The rotor hub assembly of claim 9, wherein each outer bearing is an outer snubber bearing.

11. The rotor hub assembly of claim 8, wherein a rotor blade is operably connectable to each flex beam via one of the plurality of torque tubes.

12. A rotor assembly for a helicopter comprising:
a rotor hub operably connectable to a shaft of a helicopter;
at least two flex beams extending through the rotor hub within the same plane, the at least two flex beams comprising a first flex beam and a second flex beam, wherein an opening formed in the first flex beam defines a passage through which the second flex beam extends through the first flex beam such that the first flex beam and the second flex beam cross at an axis of the shaft;

one or more inner bearings disposed at the rotor hub to spherically support the at least two flex beams in the rotor hub, the rotor hub being configured to provide a preload required for operation of the one or more inner bearings; and a plurality of rotor blades, each rotor blade operably connected to one end of the at least two flex beams.

13. The rotor assembly of claim 12, wherein the one or more inner bearings are one or more inner snubber bearings.

14. The rotor assembly of claim 12, wherein the one or more inner bearings include a first inner bearing and a second inner bearing configured to spherically supported each flexbeam.

15. The rotor assembly of claim 12, wherein the rotor hub comprises an upper hub secured to a lower hub.

16. The rotor assembly of claim 15, wherein a compressive force between the upper hub and lower hub retains the one or more inner bearings in the rotor hub.

17. The rotor assembly of claim 15, wherein the upper hub and the lower hub define a hub cavity there between.

18. The rotor assembly of claim 17, wherein the at least two flex beams extend through the hub cavity.

19. The rotor assembly of claim 12, further comprising a plurality of torque tubes, wherein a first torque tube is secured to a first end of each flex beam and a second torque tube is secured to a second, opposite end of each flex beam.

20. The rotor assembly of claim 19, wherein the first torque tube and the second torque tube are secured to the first end and the second end of each flex beam, respectively via an outer bearing.

21. The rotor assembly of claim 20, wherein each outer bearing is an outer snubber bearing.

22. The rotor assembly of claim 19, wherein a rotor blade is operably connectable to each flex beam via one of the plurality of torque tubes.

* * * * *